United States Patent
Natsume

(10) Patent No.: US 8,004,707 B2
(45) Date of Patent: Aug. 23, 2011

(54) COMMUNICATION APPARATUS

(75) Inventor: Masahiko Natsume, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 906 days.

(21) Appl. No.: 11/994,389

(22) PCT Filed: Jul. 12, 2006

(86) PCT No.: PCT/JP2006/313903
§ 371 (c)(1),
(2), (4) Date: Dec. 31, 2007

(87) PCT Pub. No.: WO2007/007809
PCT Pub. Date: Jan. 18, 2007

(65) Prior Publication Data
US 2009/0033981 A1 Feb. 5, 2009

(30) Foreign Application Priority Data
Jul. 13, 2005 (JP) .............................. P2005-204782

(51) Int. Cl.
*G06F 15/00* (2006.01)
*G06F 3/12* (2006.01)
*G06K 1/00* (2006.01)
*H04N 1/00* (2006.01)
(52) U.S. Cl. ....................................... 358/1.15; 358/435
(58) Field of Classification Search .................... 358/1.1, 358/1.15, 1.13, 1.14, 435, 438
See application file for complete search history.

(56) References Cited

U.S. PATENT DOCUMENTS
7,535,590 B2 * 5/2009 Yoshida ....................... 358/1.15

FOREIGN PATENT DOCUMENTS
| JP | 4-275764 A | 10/1992 |
| JP | 11-187240 A | 7/1999 |
| JP | 11-205573 A | 7/1999 |
| JP | 2001-358822 A | 12/2001 |
| JP | 2004-236025 A | 8/2004 |

* cited by examiner

Primary Examiner — Douglas Q Tran
(74) Attorney, Agent, or Firm — Birch, Stewart, Kolasch & Birch, LLP

(57) ABSTRACT

A communication apparatus is provided that can easily select either one of a public telephone network and an Internet communication network through which information is to be transmitted and that transmits the information through the selected communication network. A telephone line communication means (12) exhibits a disconnected state where no current flows between a telephone exchange and the telephone line communication means (12) when a first handset (14) is placed on a first placement section, while the telephone line communication means (12) exhibits a connected state where a current flows between the telephone exchange and the telephone line communication means (12) when the first handset (14) is not placed on the first placement section. A user can switch the disconnected state and the connected state when placing the first handset (14) on the first placement section or taking up the first handset (14) from the first placement section. A line state detecting section (26) detects whether the line state is the disconnected state or the connected state. The communication apparatus (1) transmits image information through the Internet communication network in the disconnected state, and it transmits image information through the public telephone network in the connected state.

5 Claims, 8 Drawing Sheets

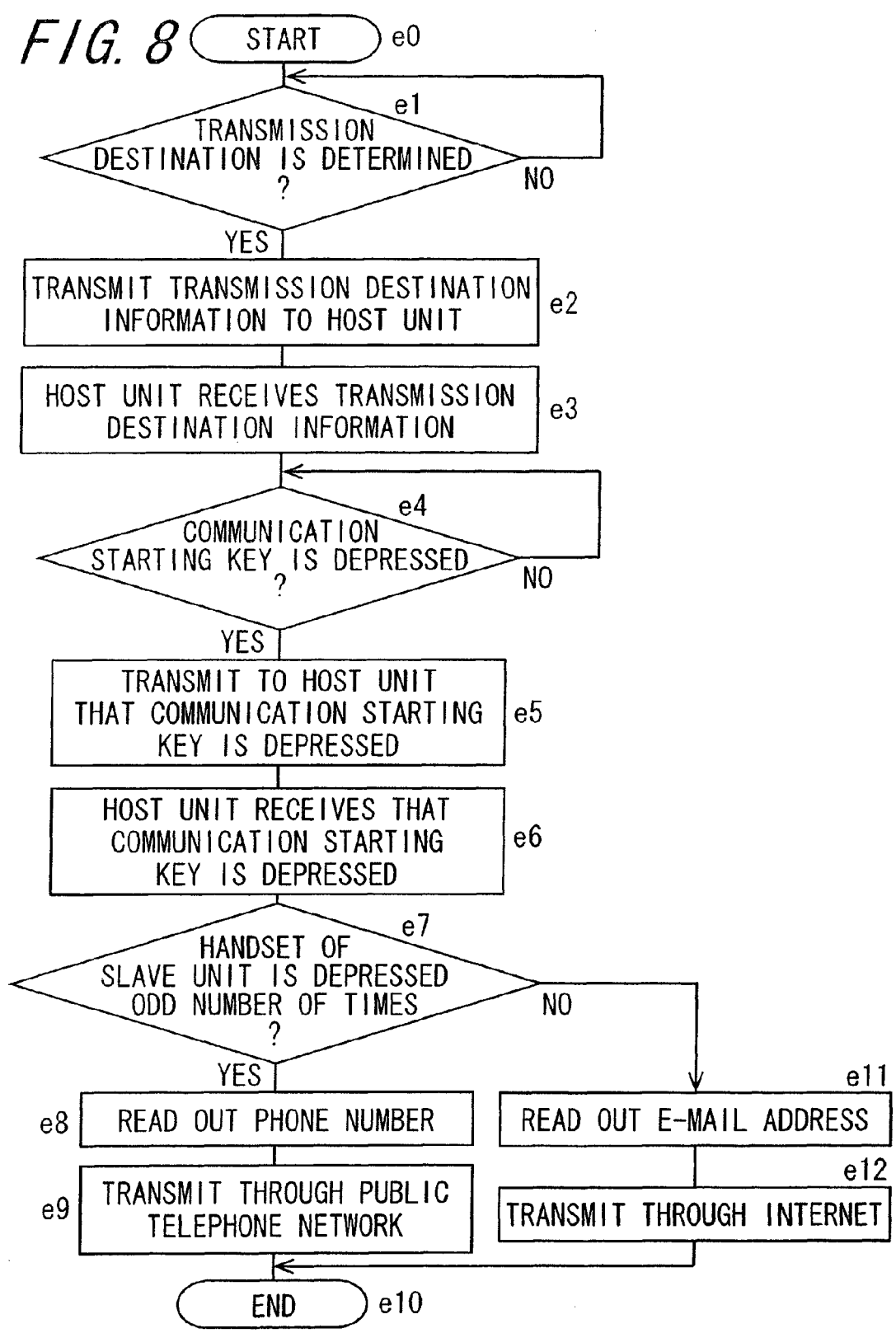

COMMUNICATION APPARATUS

TECHNICAL FIELD

The present invention relates to a communication apparatus such as an Internet facsimile apparatus that transmits information to a public telephone network or an Internet communication network.

BACKGROUND ART

There has been a facsimile apparatus capable of performing a facsimile communication through either one of two networks, a public network and an Internet. In a related art, a user of a facsimile apparatus previously registers, for each transmission destination, that through which network of the two networks image information is to be transmitted. As a result, the facsimile apparatus transmits the image information to a transmission destination through the previously registered network of the two networks (refer to, for example, Japanese Unexamined Patent Publication JP-A 2001-358822).

In the related art, a problem arises that a network through which image information is to be transmitted must be registered in advance for each transmission destination, in order to transmit image information through either one of the two networks.

In addition, in the case where it is desired to transmit image information to a transmission destination through a network that is different from the previously registered network, for example, when a failure occurs in the previously registered network, a problem arises that the previously registered network must be changed.

DISCLOSURE OF INVENTION

An object of the invention is to provide a communication apparatus that is capable of easily selecting either one of a public telephone network and an Internet communication network through which information is to be transmitted and that transmits the information through the selected communication network.

The invention provides a communication apparatus which is capable of performing a telephone line communication by use of a public telephone network as well as performing an Internet communication by use of an Internet communication network and which transmits information to the public telephone network or the Internet communication network, the communication apparatus comprising:

storage means for storing, for respective transmission destinations, a phone number and e-mail address corresponding to a transmission destination;

selecting means for selecting a predetermined transmission destination from among the transmission destinations stored in the storage means;

telephone line communication means for transmitting the information to the public telephone network;

Internet communication means for transmitting the information to the Internet communication network;

line state switching means for selectively switching a first line state where the telephone line communication means is connected to the public telephone network, and a second line state where the telephone line communication means is disconnected from the public telephone network;

line state detecting means for detecting whether the telephone line communication means is in the first line state or in the second line state with respect to the public telephone network; and controlling means for, in response to a detection result of the line state detecting means, causing the telephone line communication means to transmit the information to the transmission destination selected by the selecting means when the line state detecting means detects the first line state, and causes the Internet communication means to transmit the information to the transmission destination selected by the selecting means when the line state detecting means detects the second line state.

In accordance with the invention, the controlling means causes the telephone line communication means to transmit the information to the transmission destination in the case of the first line state, and causes the Internet communication means to transmit the information to the transmission destination in the case of the second line state. The first line state and the second line state are capable of being switched selectively by the line state switching means. Accordingly, the first line state and the second line state are switched, and thereby it is possible to select either one of the two networks, the public telephone network and the Internet communication network, and to transmit the information through the selected network. As a result, it is possible to transmit the information through the user's desired network of the two networks, even if the network to transmit the information is not previously registered for each transmission destination.

Further, in the invention, it is preferable that the communication apparatus further comprises an operation switch, the line state detecting means detects whether or not the operation switch is operated, and the line state switching means, based on the detection result of the line state detecting means, switches from the first line state to the second line state when the operation switch is operated in the first line state, and switches from the second line state to the first line state when the operation switch is operated in the second line state.

In accordance with the invention, when the operation switch is operated, the line state detecting means detects that the operation switch is operated, and based on the detection result, the line state switching means then switches the first line state and the second line state. That is, the operation switch is operated, and thereby the first line state and the second line state are switched. The controlling means causes the telephone line communication means to transmit the information to the transmission destination in the case of the first line state, and causes the Internet communication means to transmit the information to the transmission destination in the case of the second line state. Accordingly, a simple operation of operating the operation switch allows the user to select the desirable network of the two networks, the public telephone network and the Internet communication network, and to transmit the information through the selected network.

Further, in the invention, it is preferable that the communication apparatus further comprises:

first wireless communication means capable of communicating by radio; and second wireless communication means capable of communicating with the first wireless communication means by radio, the second wireless communication means transmits the detection result of the line state detecting means to the first wireless communication means, and the line state switching means obtains the detection result of the line state detecting means received by the first wireless communication means.

In accordance with the invention, when the operation switch is operated, the line state detecting means detects that the operation switch is operated, and the second wireless communication means transmits the detection result to the first wireless communication means by a wireless communication. The line state switching means then switches one of the first line state and the second line state to the other one of the first line state and the second line state, based on the detection result of the line state detecting means. The detection result of the line state detecting means is transmitted from the second wireless communication means to the first wireless communication means by a wireless communication, and thereby the user is capable of switching the first line state and the second line state, even when the user is away from the first wireless communication means. The controlling means causes the telephone line communication means to transmit the information in the case of the first line state, and causes the Internet communication means to transmit the information in the case of the second line state. Accordingly, the user is capable of selecting the desirable network of the two networks, the public telephone network and the Internet communication network, and transmitting the information through the selected network, even when the user is away from the first wireless communication means.

Further, in the invention, it is preferable that the communication apparatus further comprises:

a handset; and a placement section on which the handset is capable of being placed, the line state detecting means detects whether or not the handset is placed on the placement section, and the line state switching means, based on the detection result, switches to the second line state when the handset is placed on the placement section, and switches to the first line state when the hand set is not placed on the placement section.

In accordance with the invention, the line state switching means, based on the detection result, switches to the second line state when the handset is placed on the placement section, and switches to the first line state when the hand set is not placed on the placement section. The state where the handset is placed on the placement section is referred to as an on-hook state, and the state where the handset is not placed on the placement section is referred to as an off-hook state. Accordingly, when the user keeps the handset in the off-hook state, the telephone line communication means is in the first line state, and when the user keeps the handset in the on-hook state, the telephone line communication means is in the second line state. The controlling means causes the telephone line communication means to transmit the information in the case of the first line state, and causes the Internet communication means to transmit the information in the case of the second line state. Accordingly, a simple operation of making the handset be in the on-hook state or in the off-hook state allows the user to select the desirable network of the two networks, the public telephone network and the Internet communication network, and to transmit the information through the selected network.

Further, in the invention, it is preferable that the communication apparatus further comprises:

first wireless communication means capable of communicating by radio; and second wireless communication means capable of communicating with the first wireless communication means by radio, the second wireless communication means transmits the detection result of the line state detecting means to the first wireless communication means, and the line state switching means obtains the detection result of the line state detecting means received by the first wireless communication means.

In accordance with the invention, the line state detecting means detects whether or not the handset is placed on the placement section, that is, whether the handset is in the on-hook state or in the off-hook state, and then the second wireless communication means transmits the detection result to the first wireless communication means by a wireless communication. The switching means, based on the detection result of the line state detecting means, switches to the first line state in the case of the off-hook state, and switches to the second line state in the case of the on-hook state. The detection result of the line state detecting means is transmitted from the second wireless communication means to the first wireless communication means by a wireless communication, and thereby the user is capable of switching to the desirable line state of the first line state and the second line state, even when the user is away from the first wireless communication means. The controlling means causes the telephone line communication means to transmit the information in the case of the first line state, and causes the Internet communication means to transmit information in the case of the second line state. Accordingly, the user is capable of selecting the desirable network of the two networks, the public telephone network and the Internet communication network, and transmitting the information through the selected network, even when the user is away from the first wireless communication means.

BRIEF DESCRIPTION OF DRAWINGS

Other and further objects, features, and advantages of the invention will be more explicit from the following detailed description taken with reference to the drawings wherein:

FIG. 8 is a flowchart illustrating a process in which the communication apparatus transmits image information to a transmission destination based on the number of depressions of a second hook button.

BEST MODE FOR CARRYING OUT THE INVENTION

Figure 1:
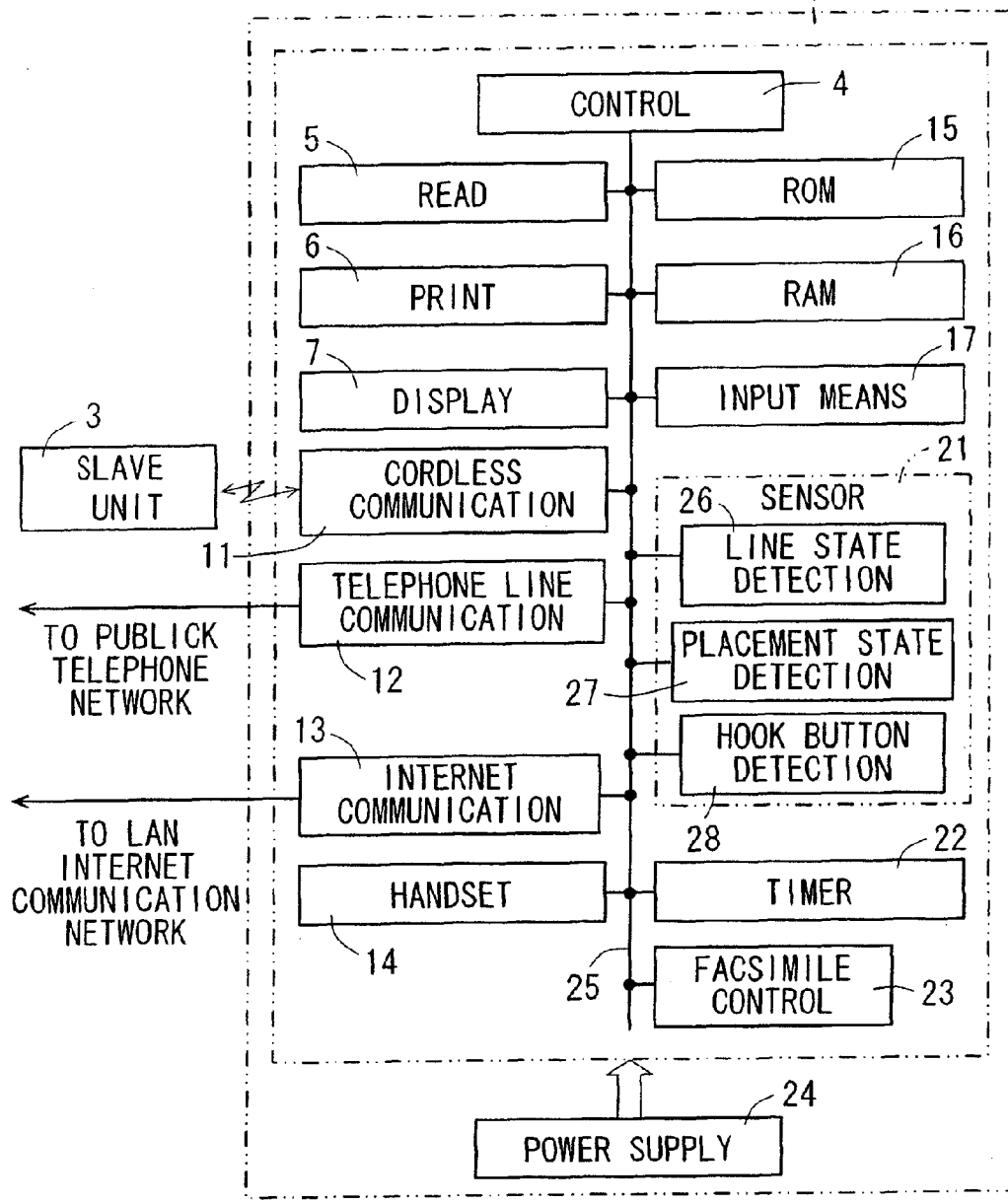
FIG. 1 is a block diagram showing an electrical configuration in a host unit of a communication apparatus according to one embodiment of the invention.

Now referring to the drawings, preferred embodiments of the invention are described below.

Figure 2:
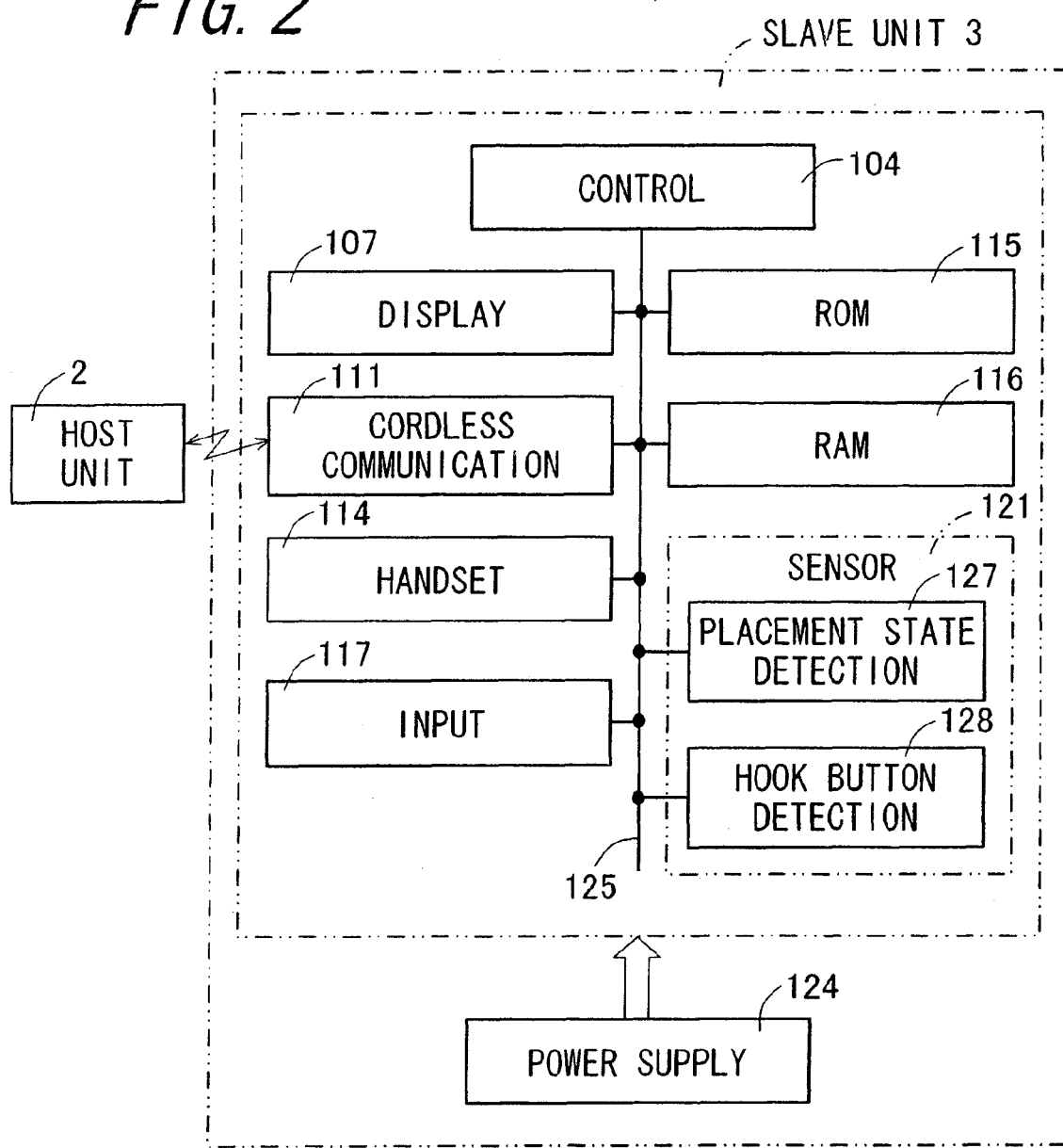
FIG. 2 is a block diagram showing an electrical configuration in a slave unit of the communication apparatus according to one embodiment of the invention.

FIG. 1 is a block diagram showing an electrical configuration in a host unit 2 of a communication apparatus 1 according to one embodiment of the invention. FIG. 2 is a block diagram showing an electrical configuration in a slave unit 3 of the communication apparatus 1 according to one embodiment of the invention. The communication apparatus 1 is composed of the host unit 2 and the slave unit 3 which communicate with each other by radio.

The communication apparatus 1 of the embodiment is a multifunctional composite machine having a facsimile communication function, a telephone communication function, a copy function, a scanner function, a print function or the like. The communication apparatus 1 is electrically connected to a telephone exchange, and connected to a public telephone network through the telephone exchange. The communication apparatus 1 transmits predetermined information to other communication apparatus through the public telephone network, or receives predetermined information transmitted from other communication apparatus through the public telephone network. In addition, the communication apparatus 1 is connected to a router by a LAN (Local Area Network) cable. Through the router, the communication apparatus 1 is connected to an Internet communication network. The communication apparatus 1 transmits predetermined information to other communication apparatus through the Internet communication network, or receives predetermined information transmitted from other communication apparatus through the Internet communication network.

The host unit 2 and the slave unit 3 are capable of communicating with each other by radio. The slave unit 3 is capable of communicating with other communication apparatus through the host unit 2.

The host unit 2 is composed of first controlling means 4, reading means 5, printing means 6, first display means 7, first cordless communication means 11, which serves as first wireless communication means, telephone line communication means 12, Internet communication means 13, a first handset 14, a first ROM (Read Only Memory) 15, a first RAM (Random Access Memory) 16, which serves as storage means, first input means 17, first sensor means 21, which serves as line state detecting means, timer means 22, facsimile controlling means 23, first power supply means 24, and a first bus 25.

The first controlling means 4 is realized by a first central processing unit (abbreviated as CPU). The first controlling means 4, the reading means 5, the printing means 6, the first display means 7, the first cordless communication means 11, the telephone line communication means 12, the Internet communication means 13, the first handset 14, the first ROM 15, the first RAM 16, the first input means 17, the first sensor means 21, the timer means 22, and the facsimile controlling means 23, are electrically connected to each other by the first bus 25. The first controlling means 4, through the first bus 25, reads out and performs a controlling program stored in the first ROM 15 to control the reading means 5, the printing means 6, the first display means 7, the first cordless communication means 11, the telephone line communication means 12, the Internet communication means 13, the first handset 14, the first ROM 15, the first RAM 16, the first input means 17, the first sensor means 21, the timer means 22, the facsimile controlling means 23, and the first power supply means 24.

The first ROM 15 is realized by a nonvolatile memory. In the first ROM 15, the control program is stored which is read out and executed by the first controlling means 4.

The first RAM 16 is realized by a nonvolatile memory and a volatile memory. The first RAM 16 stores destination information or the like including phone numbers, e-mail addresses or the like of transmission destinations, based on an instruction from the first controlling means 4. In addition, the first RAM 16 includes a display screen buffer and a work area memory. The display screen buffer is realized by a VRAM (Video RAM), and stores image information to be displayed on the first display means 7. The work area memory temporarily stores information or the like which is used by the first controlling means 4 to control each means or the like.

The first bus 25 is realized by a conductive signal line including an address bus, a data bus, and a control bus. The first controlling means 4 provides an electrical signal indicative of a control instruction to each means through the first bus.

The first input means 17 is composed of a first numeric keypad, a first setting input key for inputting setting information, a first communication starting key for inputting an instruction to start a facsimile communication, and a first hook button, which serves as an operation switch. When the first numeric keypad or the like is operated by a user, the first input means 17 provides an instruction corresponding to the operation to the first controlling means 4. For example, when the user depresses the first communication starting key, the first input means 17 provides an instruction to the first controlling means 4 to start a facsimile communication. On the basis of the instruction, the first controlling means 4 controls LAN controlling means or the telephone line communication means 12 to be described later, to transmit image information to a transmission destination. In addition, the user's operation of the first numeric keypad or the like allows the destination information or the like to be stored in the first RAM 16.

The first sensor means 21 includes a line state detecting section 26 for detecting a line state, a first placement state detecting section 27 for detecting whether or not the first handset 4 is placed on a first placement section, and a first hook button detecting section 28 for detecting whether or not the first hook button is depressed.

The line state detecting section 26 detects a line state. Specifically, the line state detecting section 26 detects whether the line state is a first line state where the telephone line communication means 12 is connected to the public telephone network, or in a second line state where the telephone line communication means 12 is disconnected from the public telephone network. To be more specific, the first line state is a state where a current flows between the communication apparatus 1 and the telephone exchange, and the second line state is a state where no current flows between the communication apparatus 1 and the telephone exchange. Note that, in the embodiment, the first line state may be referred to as a connected state and the second line state may be referred to as a disconnected state.

The line state detecting section 26 determines whether or not a current flows between the communication apparatus 1 and the telephone exchange, and thereby determines whether the line state is in the connected state or in the disconnected state. The line state detecting section 26 is composed of a photo coupler, and detects whether or not a current flows between the communication apparatus 1 and the telephone exchange. The photo coupler is composed of a light-emitting diode which emits light, and a photodiode which receives the light emitted from the light-emitting diode. The light-emitting diode is disposed on a circuit through which a current flows in the connected state, and emits light in the connected state. The light-emitting diode emits light in the connected state and the photodiode receives the light, and thereby the line state detecting section 26 detects that the line state is the connected state. On the other hand, in the case of the disconnected state, the light-emitting diode emits no light and the photodiode receives no light from the light-emitting diode, and thereby the line state detecting section 26 detects that the line state is the disconnected state. As a result, the line state detecting section 26 detects whether the line state is in the connected state or in the disconnected state. When the line state detecting section 26 detects a switch from the connected state to the disconnected state, or detects a switch from the connected state to the disconnected state, the line detecting section 26 provides line state information indicative of the detection result to the first controlling means 4 through the first bus 25. The first controlling means 4 provides the first RAM 16 with the line state information imparted by the line state detecting section 26, and causes the first RAM 16 to store the line state information.

The first placement state detecting section 27 detects whether or not the first handset 14 is placed on the first placement section. Note that, in the embodiment, a state where the first handset 14 is placed on the first placement section may be referred to as a first on-hook state, and a state where the first handset 14 is not placed on the first placement section may be referred to as a first off-hook state. The first placement state detecting section 27 includes a circuit through which a current flows when the first handset 14 is placed on the first placement section, and a current detecting section which detects the current flowing through the circuit. When the user operates the first handset 14 and places the first handset 14 on the first placement section so that the first off-hook state is switched to the first on-hook state, the first placement state detecting section 27 detects the change of the current flowing through the circuit and thus detects the switch from the first off-hook state to the first on-hook state. In addition, when the user operates the first handset 14 and picks up the first handset 14 from the first placement section so that the first on-hook state is switched to the first off-hook state, the first placement state detecting section 27 detects that no current is flowing through the circuit and thus detects the switch from the first on-hook state to the first off-hook state. When the first placement state detecting section 27 detects the switch from the first on-hook state to the first off-hook state, or the switch from the first off-hook state to the first on-hook state, then the first placement state detecting section 27 provides first hook state information indicative of the detection result to the first controlling means 4 thorough the first bus 25.

The first hook button detecting section 28 detects whether or not the first hook button is depressed. The first hook button detecting section 28 includes a circuit through which a current flows when the first hook button is depressed, and a current detecting section which detects the current flowing through the circuit. When the user depresses the first hook button so that a current flows through the circuit, the first hook button detecting section 28 detects the current and thus detects that the first hook button is depressed. When the first hook button detecting section 28 detects that the first hook button is depressed, the first hook button detecting section 28 provides first hook button depressing information indicative of the detection result to the first controlling means 4 through the first bus 25.

When a predetermined time has passed from a time at which the first controlling means 4 performs a given instruction, the timer means 22 provides the first controlling means 4 with information showing that the predetermined time has passed.

The facsimile controlling means 23 modulates image information generated by the reading means 5 into image information which is suitable for data to be transmitted to a transmission destination through the public telephone network or the Internet communication network, and demodulates the image information received through the public telephone network or the Internet communication network into image information which is suitably used by the first display means 7 or the printing means 6 to produce a visible display.

The reading means 5 employs a contact image sensor (abbreviated as CIS) using a rod lens array and a CCD (charge coupled device) image sensor to read an image on an original document and then generate image information. The image information generated by the reading means 5 is stored in the first RAM 16. The printing means 6 prints on a sheet, using an inkjet method, image information received through the public telephone network or the Internet communication network, image information generated by the reading means 5, or the like.

Based on a control instruction given by the first controlling means 4, the first display means 7 displays a standby screen showing a standby mode, a registration setting screen for registering destination information or the like, a transmission destination selecting screen for selecting a transmission destination or the like. The first display means 7 is realized by a liquid crystal display panel.

The first cordless communication means 11 communicates with the slave unit 3 by radio. The first cordless communication means 11 transmits predetermined information to the slave unit 3, and receives the predetermined information transmitted from the slave unit 3. The first cordless communication means 11 is composed of an antenna, a tuner or the like. The host unit 2 and the slave unit 3 mutually transmit and receive not only sound information but control instructions through the first cordless communication means 11.

The telephone line communication means 12 performs a process of switching the disconnected state and the connected state based on an instruction from the first controlling means 4, a process of a telephone communication in accordance with a procedure of the telephone communication, or the like. In addition, the telephone line communication means 12 performs a process of transmitting image information stored in the first RAM 16 to a transmission destination through the public telephone network, or a process of receiving image information transmitted from other communication apparatus through the public telephone networks, in accordance with Standardization of Group 3 facsimile transmission procedure that complies with a recommendation of the International Telecommunication Union (abbreviated as ITU). Line state switching means and telephone line communication means are realized by the telephone line communication means 12.

The Internet communication means 13 converts predetermined information into an electrical signal that meets a given LAN standard, and provides the converted electrical signal to the router connected with the communication apparatus 1 by the LAN cable. The given LAN standard refers to a standard for the first and second layers in the OSI (open systems interconnection) reference model. In accordance with an Internet communication protocol, the Internet communication means 12 transmits image information as an attachment to an e-mail to a transmission destination through the Internet communication network, or receives image information transmitted from other communication apparatus through the Internet communication network. The Internet communication means 13 is realized by a network interface card (abbreviated as NIC) or the like.

The first handset 14 is realized by a speaker and a microphone. The speaker outputs, as audible information, sound information transmitted from a transmission destination through the public telephone network or sound information transmitted from the slave unit 3 by a wireless communication, in accordance with a control instruction from the first controlling means 4. In addition, the microphone converts sound information into an electrical signal indicative of the sound information.

The first power supply means 24 rectifies an AC voltage supplied from a commercial AC power supply to convert into a DC voltage, and then supplies a power to each means in the host unit 2 or the like. The first power supply means 24 is composed of an AC (alternating current)-DC (direct current) converter.

The slave unit 3 is composed of second controlling means 104, a second ROM 115, a second RAM 116 as storage means, second input means 117, second sensor means 121, second power supply means 124, second display means 107, second cordless communication means 111 as second wireless communication means, a second handset 114, and a second bus 125. Since the configuration of the slave unit 3 is identical with that of the host unit 2, overlapping descriptions for corresponding portions will be omitted.

The second controlling means 104, the second ROM 115, the second RAM 116, the second input means 117, the second sensor means 121, the second power supply means 124, the second display means 107, the second cordless communication means 111, the second handset 114, and the second bus 125, which are shown in FIG. 2, correspond to the first controlling means 4, the first ROM 15, the first RAM 16, the first input means 17, the first sensor means 21, the first power supply means 24, the first display means 7, the first cordless communication means 11, the first handset 14, and the first bus 25, which are shown in FIG. 1, respectively.

The second power supply means 124 is realized by a secondary battery, and supplies power to each means in the slave unit 3 or the like. The second power supply means 124 is charged when the second handset 114 is placed on a second placement section serving as a cradle.

The second input means 117 is composed of a second numeric keypad, a second setting registration key, a second communication starting key, and a second hook button, which serves as an operation switch. When the first numeric keypad or the like is operated by a user, the second input means 117 provides the second controlling means 104 with an instruction corresponding to the operation. The second controlling means 104 controls the second cordless communication means 111, for example, when the second communication starting key is depressed, to thereby transmit information which shows that the second communication starting key is depressed, to the host unit 2 by a wireless communication. Selecting means is realized by the first input means 17 and the second input means 117.

The second sensor means 121 includes a second placement state detecting section 127 which detects whether or not the second handset 114 is placed on the second placement section, and a second hook button detecting section 128 which detects whether or not the second hook button is depressed.

The second hook button detecting section 128 detects whether or not the second hook button is depressed. The second hook button detecting section 128 includes a circuit through which a current flows when the second hook button is depressed, and a current detecting section which detects the current flowing through the circuit. When the user depresses the second hook button so that a current flows through the circuit, the second hook button detecting section 128 detects the current and thus detects that the second hook button is depressed. When the second hook button detecting section 128 detects that the second hook button is depressed, the second hook button detecting section 128 provides second hook button depressing information indicative of the detection result to the second controlling means 104 through the second bus 125.

The second placement state detecting section 127 detects whether or not the second handset 114 is placed on the second placement section. Note that, in the embodiment, a state where the second handset 114 is being placed on the second placement section may be referred to as a second on-hook state, and a state where the second handset 114 is not placed on the second placement section may be referred to as a second off-hook state. The second placement state detecting section 127 includes a circuit through which a current flows when the second handset 114 is placed on the second placement section, and a current detecting section which detects the current flowing through the circuit. When the user operates the second handset 114 and places the second handset 114 on the second placement section so that the second off-hook state is switched to the second on-hook state, the second sensor means 121 detects the change in the current flowing through the circuit and thus detects a switch from the second off-hook state to the second on-hook state. In addition, when the user operates the second handset 114 and takes up the second handset 114 from the second placement section so that the second on-hook state is switched to the second off-hook state, the second placement state detecting section 127 detects that no current is flowing through the circuit and thus detects a switch from the second on-hook state to the second off-hook state. When the second placement state detecting section 127 detects the switch from the second on-hook state to the second off-hook state, or the switch from the second off-hook state to the second on-hook state, then the second placement state detecting section 127 provides second hook state information indicative of the detection result to the second controlling means 104 through the second bus 125.

When the second sensor means 121 provides the second controlling means 104 with the detection result including second hook button depressing information or second hook state information, then the second controlling means 104 controls the second cordless communication means 111 to transmit the detection result of the second sensor means 121 to the host unit 2 by a wireless communication.

The detection result of the second sensor means 121 transmitted from the slave unit 3 to the host unit 2 is received by the first cordless communication means 11 in the host unit 2. The first cordless communication means 11 delivers the received detection result of the second sensor means 121 to the first controlling means 4 through the first bus 25. The first controlling means 4 causes the first RAM 16 to store the provided detection result of the second sensor means 121.

Next, a process will be described that the first controlling means 4 controls the telephone line communication means 12 to switch from the disconnected state to the connected state, based on detection results of the first sensor means 21 and the second sensor means 121. Note that, in the embodiment, a state where the line state is the disconnected state, and the first handset 14 is in the first on-hook state, as well as the second handset 114 is in the second on-hook state, may be referred to as an initial state.

In the case of the initial state, when the first handset 14 is switched to the first off-hook state, the second handset 114 is switched to the second off-hook state, the first hook button is depressed, or the second hook button is depressed, then the first controlling means 4 controls the telephone line communication means 12 to switch from the disconnected state to the connected state. The first controlling means 4 further causes the first RAM 16 to store switch information showing that the disconnected state is switched to the connected state by which user's operation. Specifically, when the initial state is switched to the first off-hook state to thereby switch from the disconnected state to the connected state, then the first controlling means 4 causes the first RAM 16 to store, as switch information, information indicative of the first handset. In addition, when the initial state is switched to the second off-hook state to thereby switch from the disconnected state to the connected state, then the first controlling means 4 causes the first RAM 16 to store, as switch information, information indicative of the second handset 114. Moreover, when the first hook button is depressed in the initial state to thereby switch from the disconnected state to the connected state, then the first RAM 16 is caused to store, as switch information, information indicative of the first hook button. Furthermore, when the second hook button is depressed in the initial state to thereby switch from the disconnected state to the connected state, then the first RAM 16 is caused to store, as switch information, information indicative of the second hook button.

Next, a process will be described that the first controlling means 4 controls the telephone line communication means 12 to switch from the connected state to the disconnected state, based on the detection result of the first sensor means 21, the detection result of the second sensor means 121, and switch information.

In the case where the initial state is switched to the first off-hook state to thereby switch to the connected state, the first controlling means 4 allows to switch from the connected state to the disconnected state only when the first off-hook state is switched to the first on-hook state. That is, when the initial state is switched to the first off-hook state to thereby switch to the connected state, then the first controlling means 4 does not allow to switch from the connected state to the disconnected state, for example, even if the first hook button is depressed, after the line state is switched to the connected state. Specifically, when the first sensor means 21 provides the first controlling means 4 in the connected state, with information showing that the first off-hook state is switched to the first on-hook state, then the first controlling means 4 reads out switch information stored in the first RAM 16 and allows to switch from the connected state to the disconnected state only when it is determined that the initial state is switched to the connected state based on the switch to the first off-hook state. In addition, similarly, in the case where the initial state is switched to the second off-hook state to thereby switch to the connected state, the first controlling means 4 allows to switch from the connected state to the disconnected state only when the second off-hook state is switched to the second on-hook state. Moreover, similarly, in the case where the first hook button is depressed in the initial state to thereby switch to the connected state, the first controlling means 4 allows to switch from the connected state to the disconnected state only when the first hook button is depressed again. Furthermore, similarly, in the case where the second hook button is depressed in the initial state to thereby switch to the connected state, the first controlling means 4 allows to switch from the connected state to the disconnected state only when the second hook button is depressed again.

As described above, when the user operates the first handset 14, the second handset 114, the first hook button, or the second hook button, it is possible to switch from the connected state to the disconnected state, or from the disconnected state to the connected state.

Figure 3:
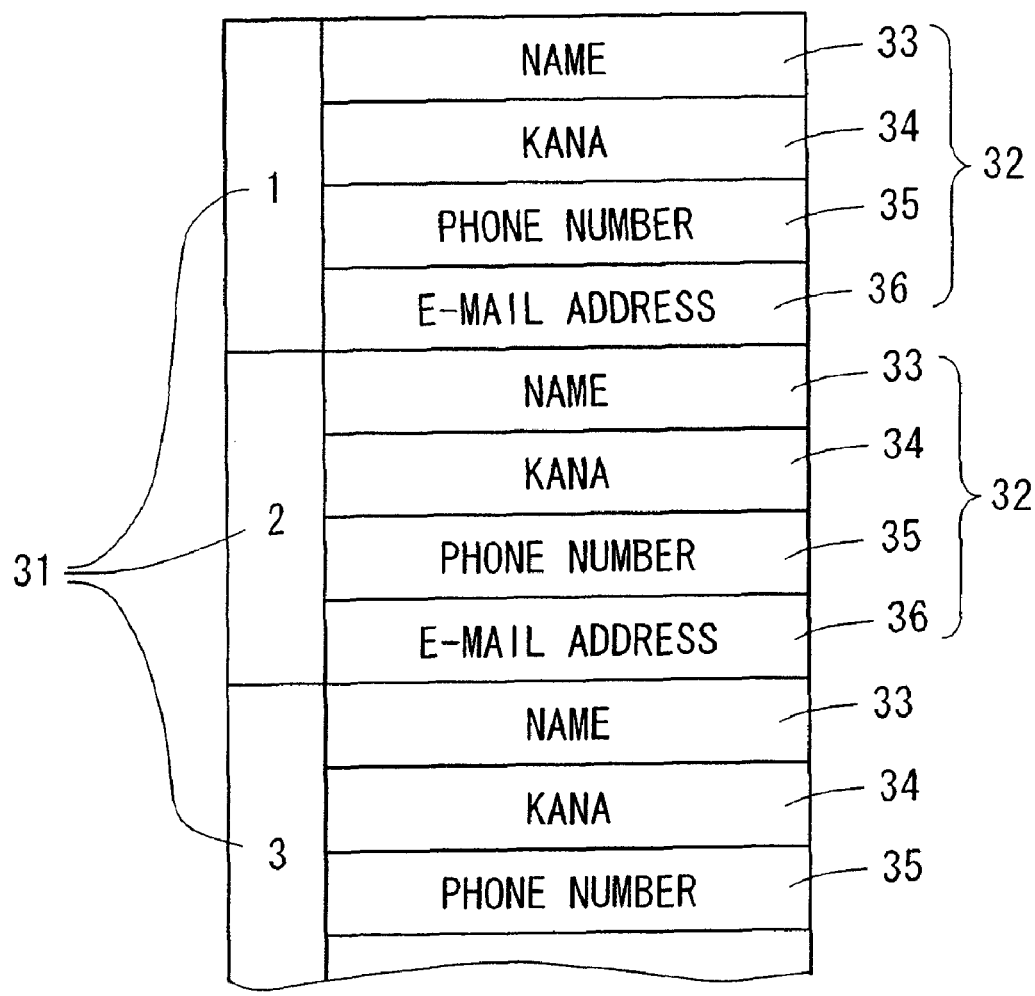
FIG. 3 is a diagram schematically showing destination information stored in a first RAM.

FIG. 3 is a diagram schematically showing destination information stored in the first RAM 16. The destination information is composed of management number information 31 which represents management numbers applied to respective transmission destinations, and private information 32 which is associated with the management number information 31 one for one. The private information 32 is composed of name information 33 in which names of transmission destinations are represented in kanji, kana information 34 in which names of transmission destinations are represented in kana, phone number information 35 which represents phone numbers of transmission destinations, and address information 36 which represents e-mail addresses of transmission destinations.

When a user of the communication apparatus 1 operates the first input means 17 in the host unit 2 to input destination information, then the first controlling means 4 causes the first RAM 16 to store the destination information and controls the first cordless communication means 11 to transmit the inputted destination information to the slave unit 3. When the slave unit 3 receives the destination information transmitted from the host unit 2, the second controlling means 104 causes the second RAM 116 to store the received destination information. In addition, when the user of the communication apparatus 1 operates the second input means 117 in the slave unit 3 to input destination information, the second controlling means 104 causes the second RAM 116 to store the destination information and controls the second cordless communication means 111 to transmit the inputted destination information to the host unit 2 by a wireless communication. When the host unit 2 receives the destination information transmitted from the slave unit 3, the first controlling means 4 causes the first RAM 16 to store the received destination information.

Figure 4:
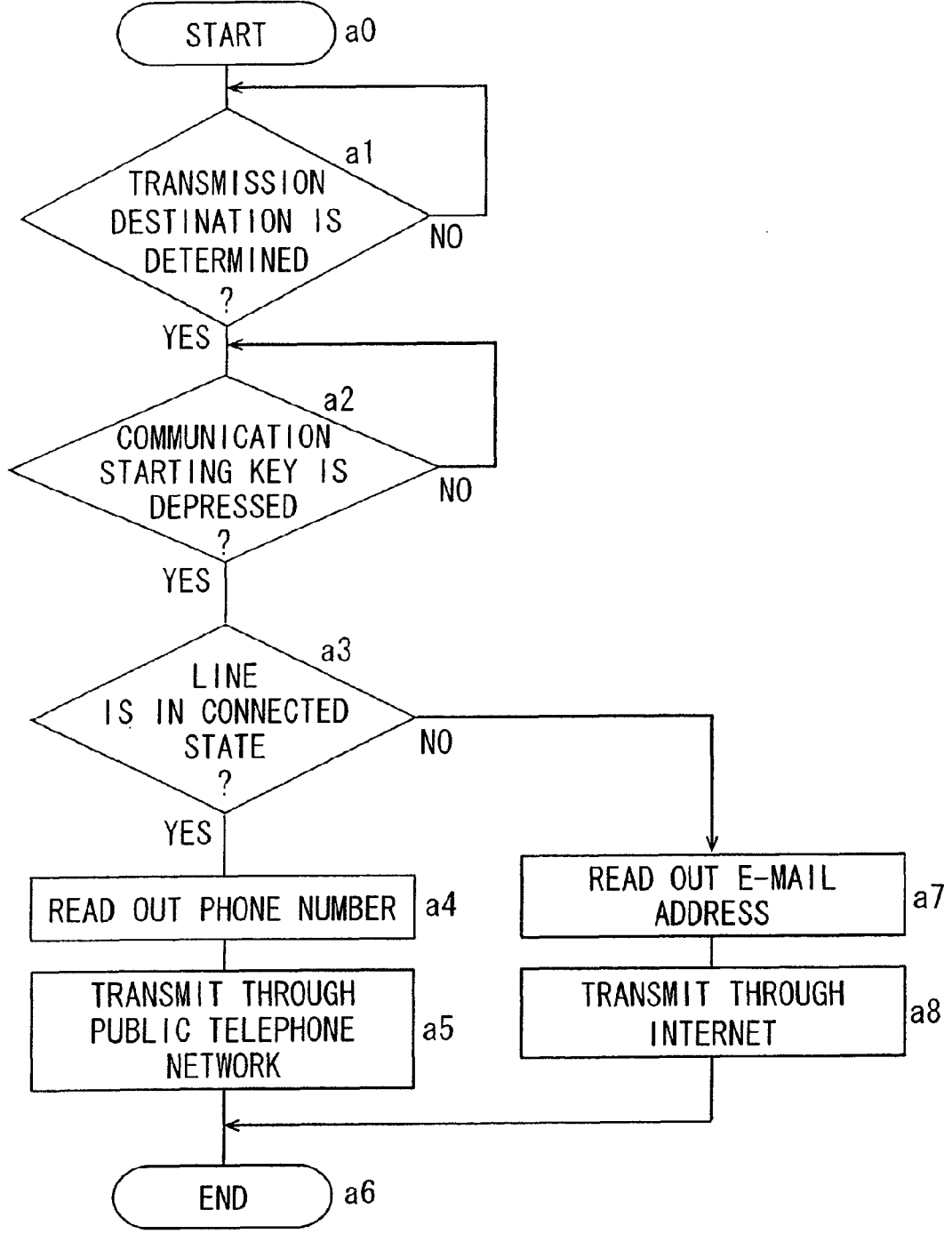
FIG. 4 is a flowchart illustrating a process of transmitting image information to a transmission destination based on a line state.

FIG. 4 is a flowchart illustrating a process of transmitting image information to a transmission destination based on a line state. When a user of the communication apparatus 1 operates the first input means 17, and thereby a transmission destination selecting screen for selecting a transmission destination is displayed on the first display means 7, the process then proceeds from Step a0 to Step a1.

The user of the communication apparatus 1 operates the first input means 17 while checking the transmission destination selecting screen displayed by the first display means 7, to thereby input to the communication apparatus 1 transmission destination specifying information for specifying a transmission destination to which image information is to be transmitted.

At Step a1, the first controlling means 4 determines whether or not the transmission destination specifying information is inputted. When the first controlling means 4 determines that the transmission destination specifying information is not inputted, Step a1 is repeated. When the first controlling means 4 determines that the transmission destination specifying information is inputted, the first controlling means 4 obtains the transmission destination specifying information, and the process then proceeds to Step a2.

At Step a2, the first controlling means 4 determines whether or not the first communication starting key is depressed. When the first controlling unit 4 determines that the first communication starting key is not depressed, Step a2 is repeated. When the first controlling means 4 determines that the first communication starting key is depressed, the process then proceeds to Step a3.

At Step a3, the first controlling means 4 reads out line state information stored in the first RAM 16 to determine whether or not the line state is the connected state. When the first controlling means 4 determines that the line state is the connected state, the process then proceeds to Step a4.

At Step a4, the first controlling means 4 reads out phone number information 35 of a transmission destination stored in the first RAM 16, based on the transmission destination specifying information obtained at Step a1, and the process then proceeds to Step a5.

At Step a5, the first controlling means 4 controls the telephone line communication means 12 to transmit the image information stored in the first RAM 16 to the transmission destination through the public telephone network, based on the phone number information 35 read out at Step a4, and the process then proceeds to Step a6 at which the process of transmitting the image information is completed.

At Step a3, when the first controlling means 4 determines that the line state is not the connected state, that is, the line state is the disconnected state, the process then proceeds to Step a7. At Step a7, the first controlling means 4 reads out e-mail address information 36 of the transmission destination stored in the first RAM 16, based on the transmission destination specifying information obtained at Step a1, and the process then proceeds to Step a8.

At Step a8, the first controlling means 4 controls the Internet communication means 13 to transmit the image information stored in the first RAM 16 to the transmission destination through the Internet communication network, based on the e-mail address information 36 read out at Step a7, and the process then proceeds to Step a6. At Step a6, the process of transmitting the image information is completed.

As described above, when the user inputs the transmission destination specifying information and depresses the first communication starting key, then the communication apparatus 1 transmits the image information to the transmission destination through either one of the two networks, the public telephone network and the Internet communication network, depending on whether the line state is in the connected state or in the disconnected state. The line state is capable of being switched freely when the user operates the first handset 14, the second handset 114, the first hook button, or the second hook button. Accordingly, an operation of switching the line state allows the user to freely select a network of the two networks, the public telephone network and the Internet communication network, through which the image information is to be transmitted to the transmission destination. Thus, when registering the transmission destination information, there is no need to set in advance a network of the two networks, the public telephone network and the Internet communication network, through which the image information is to be transmitted, allowing for improvement in the convenience of the user.

In another embodiment of the invention, the communication apparatus 1 transmits image information to a transmission destination through either one of the public telephone network or the Internet communication network, based on whether the first handset 14 is in the first on-hook state or in the first off-hook state.

Figure 5:
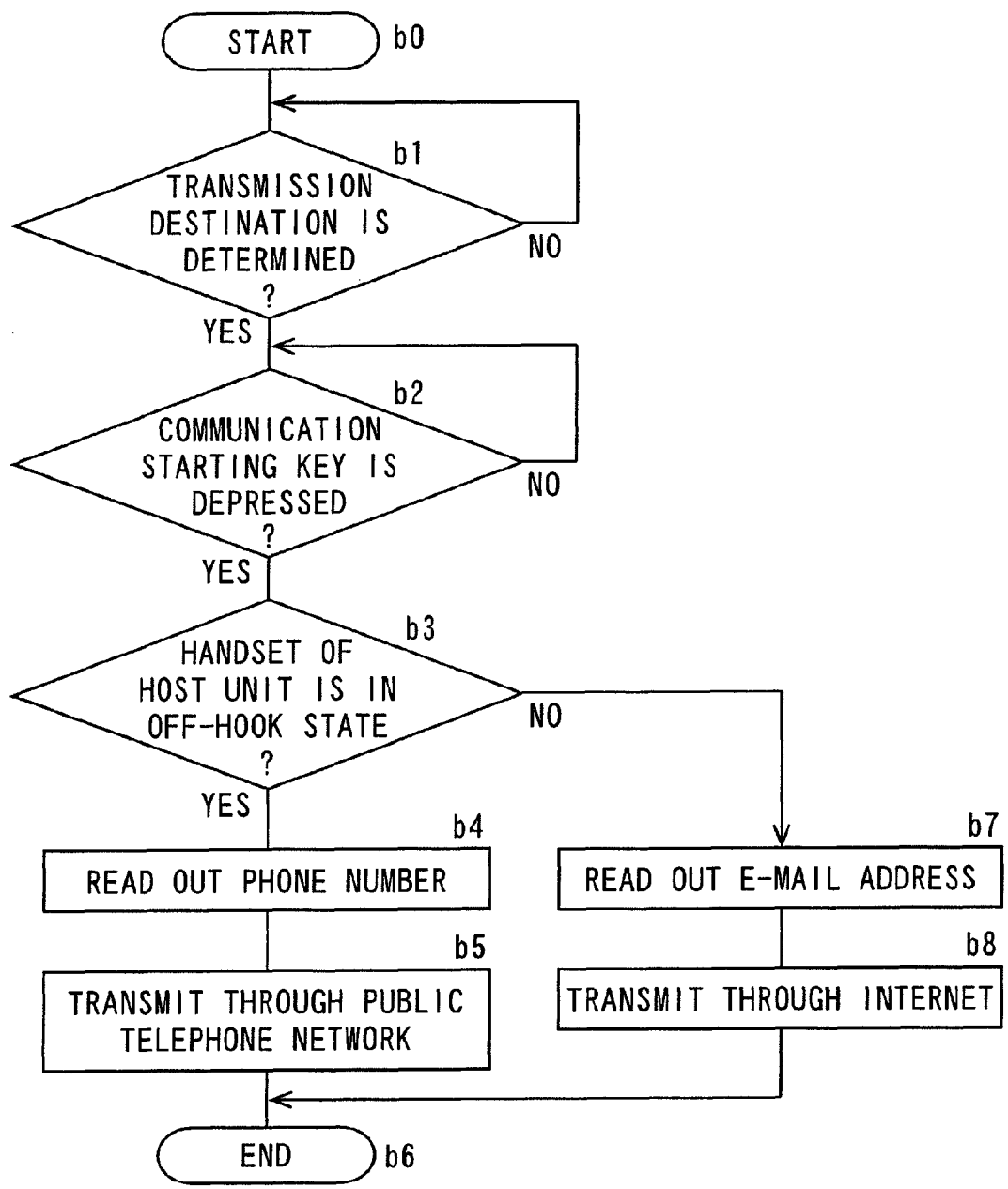
FIG. 5 is a flowchart illustrating a process in which the communication apparatus transmits image information to a transmission destination based on whether a first handset is in a first off-hook state or in a first off-hook state.

FIG. 5 is a flowchart illustrating a process in which the communication apparatus 1 transmits image information to a transmission destination based on whether the first handset 14 is in the first off-hook state or in the first off-hook state. In the initial state, when a user of the communication apparatus 1 operates the first input means 17, a transmission destination selecting screen for selecting a transmission destination is displayed on the first display means 7, and when the user starts an operation of inputting transmission destination specifying information for specifying the transmission destination, the process then proceeds from Step b0 to Step b1. In processes described below, the user should not perform an operation of switching to the second off-hook state, depressing the first hook button, or depressing the second hook button.

The user of the communication apparatus 1 operates the first input means 17 while checking the transmission destination selecting screen displayed by the first display means 7, to thereby input to the communication apparatus 1 the transmission destination specifying information for specifying the transmission destination to which image information is to be transmitted.

At Step b1, the first controlling means 4 determines whether or not the transmission destination specifying information is inputted. When the first controlling means 4 determines that the transmission destination specifying information is not inputted, Step b1 is repeated. When the first controlling means 4 determines that the transmission destination specifying information is inputted, the first controlling means 4 obtains the transmission destination specifying information, and the process then proceeds to Step b2.

At Step b2, the first controlling means 4 determines whether or not the first communication starting key is depressed. When the first controlling means 4 determines that the first communication starting key is not depressed, Step b2 is repeated. When the first controlling means 4 determines that the first communication starting key is depressed, the process then proceeds to Step b3.

At Step b3, the first controlling means 4 reads out the detection result of the first sensor means 21 stored in the first RAM 16 to determine whether or not the first handset 14 is in the first off-hook state. When the first controlling means 4 determines that the first handset 14 is in the first off-hook state, the process then proceeds to Step b4.

At Step b4, the first controlling means 4 reads out phone number information 35 of the transmission destination stored in the first RAM 16, based on the transmission destination specifying information obtained at Step b1, and the process then proceeds to Step b5.

At Step b5, the first controlling means 4 controls the telephone line communication means 12 to transmit the image information stored in the first RAM 16 to the transmission destination through the public telephone network, based on the phone number information 35 read out at Step b4, and the process then proceeds to Step b6 at which the process of transmitting the image information is completed.

At Step b3, when the first controlling means 4 determines that the first handset 14 is not in the first off-hook state, that is, the first handset 14 is in the first on-hook state, the process then proceeds to Step b7. At Step b7, the first controlling means 4 reads out e-mail address information 36 of the transmission destination stored in the first RAM 16, based on the transmission destination specifying information obtained at Step b1, and the process then proceeds to Step b8.

At Step b8, the first controlling means 4 controls the Internet communication means 13 to transmit the image information stored in the first RAM 16 to the transmission destination through the Internet communication network, based on the e-mail address information 36 read out at Step b7, and the process then proceeds to Step b6. At Step b6, the process of transmitting the image information is completed.

As described above, when the user inputs the transmission destination specifying information and depresses the first communication starting key, then the communication apparatus 1, depending on whether the first handset 14 is in the first on-hook state or in the first off-hook state, transmits the image information to the transmission destination through either one of the two networks, the public telephone network and the Internet communication network. The first on-hook state and the first off-hook state are capable of being switched by a simple operation that the user places the first handset on the first placement section, or takes up the first handset from the first placement section. Accordingly, the simple operation of placing the first handset on the first placement section, or taking up from the first placement section allows the user to freely select a network of the two networks, the public telephone network and the Internet communication network, through which the image information is to be transmitted to the transmission destination. Thus, the user is capable of easily selecting a network of the two networks, the public telephone network and the Internet communication network, through which the image information is to be transmitted, allowing for improvement in the convenience of the user.

In still another embodiment of the invention, the communication apparatus 1 transmits image information to a transmission destination through either one of the public telephone network or the Internet communication network, based on the number of depressions of the first hook button.

When the first hook button is depressed in the initial state, the first controlling means 4 causes the first RAM 16 to store a numerical value "1" as first hook button depressing information. In addition, when the first hook button is depressed in the case where the first hook button depressing information is the numerical value "1", the first controlling means 4 causes the first PAM 16 to store a numerical value "0" as the first hook button depressing information.

Figure 6:
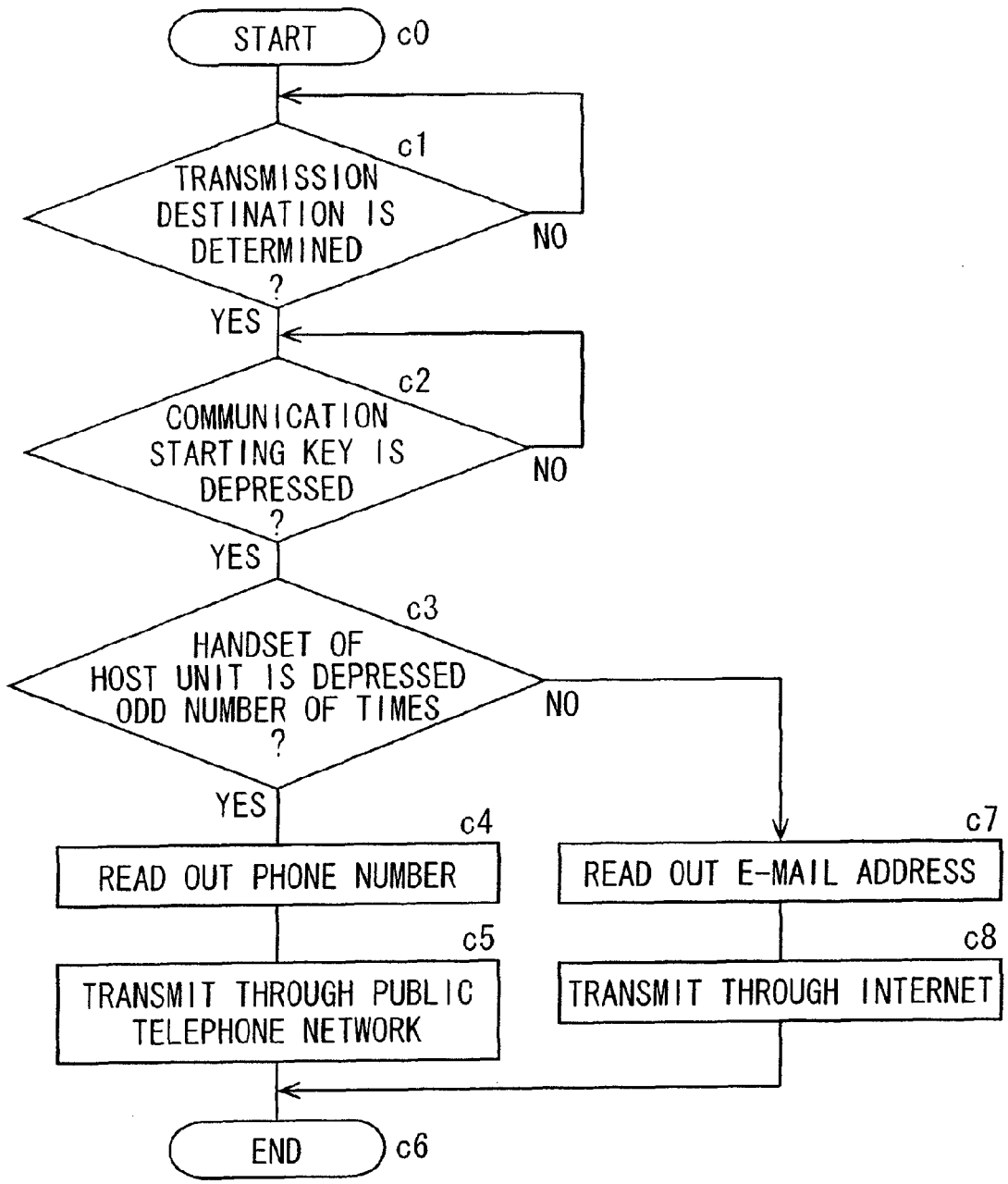
FIG. 6 is a flowchart illustrating a process in which the communication apparatus transmits image information to a transmission destination based on the number of depressions of a first hook button.

FIG. 6 is a flowchart illustrating a process in which the communication apparatus 1 transmits image information to a transmission destination based on the number of depressions of the first hook button. In the initial state, a user of the communication apparatus 1 operates the first input means 17 so that a transmission destination selecting screen for selecting a transmission destination is displayed on the first display means 7, and when the user starts an operation of inputting the transmission destination specifying information for specifying the transmission destination, the process then proceeds from Step c0 to Step c1. In processes described below, the user should not perform an operation of switching to the first off-hook state, switching to the second off-hook state, or depressing the second hook button.

The user of the communication apparatus 1 operates the first input means 17 while checking the transmission destination selecting screen displayed by the first display means 7, to thereby input to the communication apparatus 1 the transmission destination specifying information indicative of the transmission destination to which the image information is to be transmitted.

At Step c1, the first controlling means 4 determines whether or not the transmission destination specifying information is inputted. When the first controlling means 4 determines that the transmission destination specifying information is not inputted, Step c1 is repeated. When the first controlling means 4 determines that the transmission destination specifying information is inputted, the first controlling means 4 obtains the transmission destination specifying information, and the process then proceeds to Step c2.

At Step c2, the first controlling means 4 determines whether or not the first communication starting key is depressed. When the first controlling unit 4 determines that the first communication starting key is not depressed, Step c2 is repeated. When the first controlling means 4 determines that the first communication starting key is depressed, the process then proceeds to Step c3.

At Step c3, the first controlling means 4 reads out first hook button depressing information stored in the first RAM 16, and determines whether or not the first hook button has been depressed odd number of times after the user starts the operation of inputting the transmission destination specifying information. When the first controlling means 4 determines that the first hook button has been depressed odd number of times after the user starts the operation of inputting the transmission destination specifying information, that is, when the numerical value "1" is stored in the first RAM 16 as the first hook button depressing information, the process then proceeds to Step c4.

At Step c4, the first controlling means 4 reads out phone number information 35 of the transmission destination stored in the first RAM 16, based on the transmission destination specifying information obtained at Step c1, and the process then proceeds to Step c5.

At Step c5, the first controlling means 4 controls the telephone line communication means 12 to transmit the image information stored in the first RAM 16 to the transmission destination through the public telephone network, based on the phone number information 35 read out at Step c4, and the process then proceeds to Step c6 at which the process of transmitting the image information is completed.

At Step c3, when the first controlling means 4 determines that the first hook button has been depressed even number of times after the user starts the operation of inputting the transmission destination specifying information, or determines that the first hook button has never been depressed after the user starts the operation of inputting the transmission destination specifying information, the process then proceeds to Step c7. Specifically, when the numerical value "0" is stored in the first RAM 16 as the first hook button depressing information, the process then proceeds to Step c7. At Step c7, the first controlling means 4 reads out e-mail address information 36 of the transmission destination stored in the first RAM 16, based on the transmission destination specifying information obtained at Step c1, and the process then proceeds to Step c8.

At Step c8, the first controlling means 4 controls the Internet communication means 13 to transmit the image information stored in the first RAM 16 to the transmission destination through the Internet communication network, based on the e-mail address information 36 read out at Step c7, and the process then proceeds to Step c6. At Step c6, the process of transmitting the image information is completed.

As described above, when the user inputs the transmission destination specifying information and depresses the first communication starting key, the communication apparatus 1 transmits the image information to the transmission destination through either one of the two networks, the public telephone network and the Internet communication network, depending on how many times the first hook button has been depressed from the time when the user starts the operation of inputting the transmission destination until the time when the first communication starting key is depressed. Accordingly, a simple operation of depressing the first hook button allows the user to freely select a network of the two networks, the public telephone network and the Internet communication network, through which the image information is to be transmitted to the transmission destination. Thus, the user is capable of easily selecting a network of the two networks, the public telephone network and the Internet communication network, through which the image information is to be transmitted, allowing for improvement in the convenience of the user.

In still another embodiment of the invention, the communication apparatus 1 transmits, based on whether the slave unit 3 is in the second on-hook state or in the second off-hook state, image information to a transmission destination through either one of the public telephone network or the Internet communication network.

Figure 7:
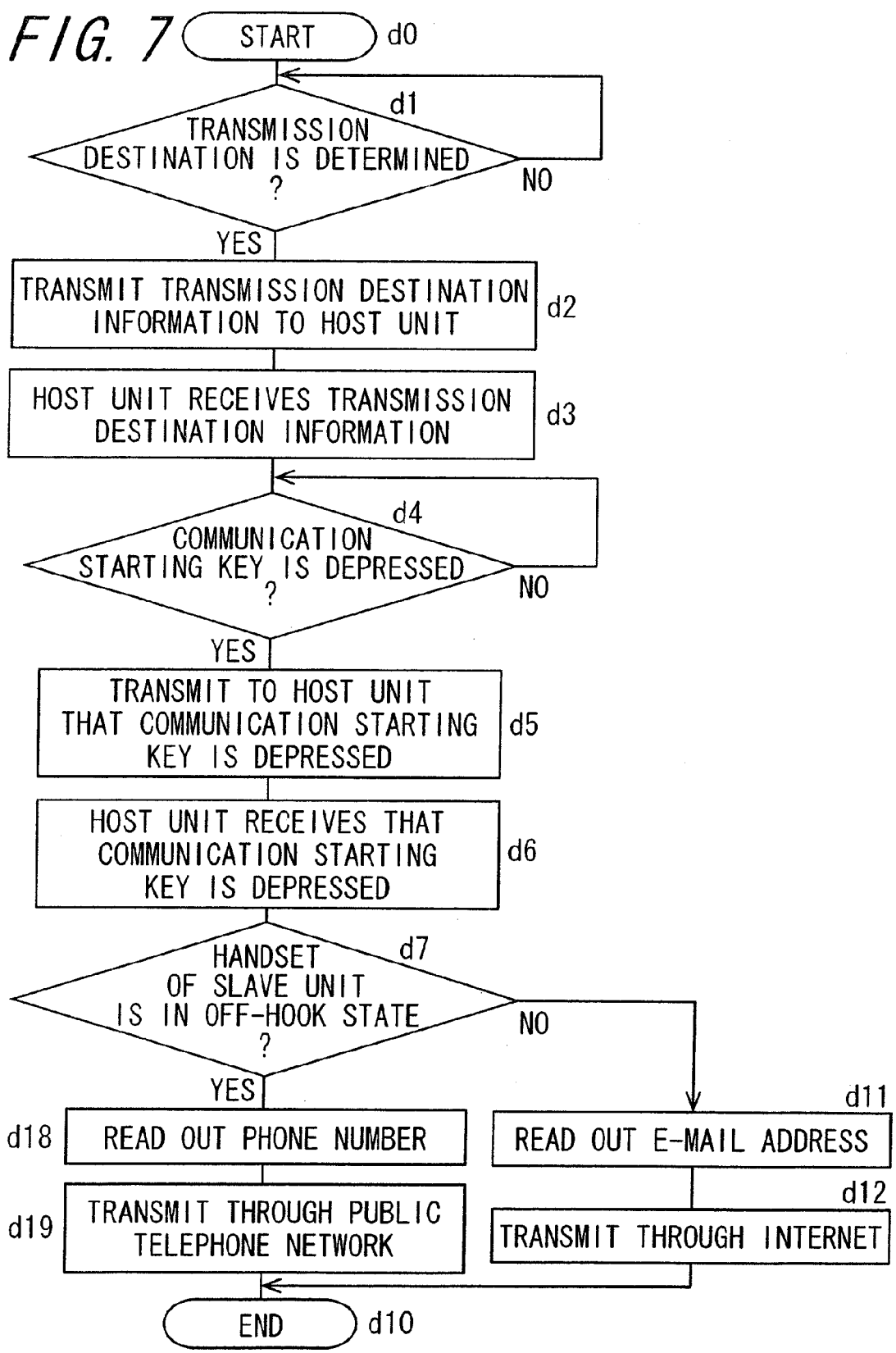
FIG. 7 is a flowchart illustrating a process in which the communication apparatus transmits image information to a transmission destination based on whether a second handset is in a second on-hook state or in a second off-hook state.

FIG. 7 is a flowchart illustrating a process in which the communication apparatus 1 transmits image information to a transmission destination based on whether the slave unit 3 is in the second on-hook state or in the second off-hook state. In the initial state, when a user of the communication apparatus 1 operates the second input means 117 in the slave unit 3, a transmission destination selecting screen for selecting the transmission destination is displayed on the second display means 107, and when the user starts the operation of inputting the transmission destination specifying information for specifying the transmission destination, the process then proceeds from Step d0 to Step d1. In processes described below, the user should not perform an operation of switching to the first off-hook state, depressing the first hook button, or depressing the second hook button.

The user of the communication apparatus 1 operates the second input means 117 while checking the transmission destination selecting screen displayed by the second display means 107, to thereby input to the communication apparatus 1 the transmission destination specifying information indicative of the transmission destination to which the image information is to be transmitted.

At Step d1, the second controlling means 104 in the slave unit 3 determines whether or not the transmission destination specifying information is inputted. When the second controlling means 104 determines that the transmission destination specifying information is not inputted, Step d1 is repeated. When the second controlling means 104 determines that the transmission destination specifying information is inputted, the second controlling means 104 obtains the transmission destination specifying information, and the process then proceeds to Step d2.

At Step d2, the second controlling means 104 controls the second cordless communication means 111 in the slave unit 3, and transmits to the host unit 2 the transmission destination specifying information obtained at Step d1, whereafter the process proceeds to Step d3.

At Step d3, the first cordless communication means 11 in the host unit 2 receives the transmission destination specifying information transmitted from the slave unit 3, and provides the transmission destination specifying information thus received to the first controlling means 4, whereafter the process proceeds to Step d4.

At Step d4, the second controlling means 104 determines whether or not the second communication starting key is depressed. When the second controlling means 104 determines that the second communication starting key is not depressed, Step d4 is repeated. When the second controlling means 104 determines that the second communication starting key is depressed, the process then proceeds to Step d5.

At Step d5, the second controlling means 104 controls the second cordless communication means 111 to transmit to the host unit 2 information showing that the second communication starting key is depressed, and the process then proceeds to Step d6.

At Step d6, the first cordless communication means 11 in the host unit 2 receives information showing that the second operation key is depressed, which is transmitted from the slave unit 3, and provides the received information to the first controlling means 4, whereafter the process proceeds to Step d7.

At Step d7, the first controlling means 4 reads out the detection result of the second sensor means 121 stored in the first RAM 16, and determines whether or not the second handset 114 is in the second off-hook state. When the first controlling means 4 determines that the second handset 114 is in the second off-hook state, the process then proceeds to Step d8.

At Step d8, the first controlling means 4 reads out phone number information 35 of the transmission destination stored in the first RAM 16, based on the transmission destination specifying information provided from the second cordless communication means 111 at Step d3, and the process then proceeds to step d9.

At Step d9, the first controlling means 4 controls the telephone line communication means 12 to transmit the image information stored in the first RAM 16 to the transmission destination through the public telephone network, based on the phone number information 35 read out at step d8, and the process then proceeds to Step d10 at which the process of transmitting the image information is completed.

At Step d7, when the first controlling means 4 determines that the second handset 114 is not in the second off-hook state, that is, the second handset 114 is in the second on-hook state, the process then proceeds to Step d11. At Step d11, the first controlling means 4 reads out e-mail address information 36 of the transmission destination stored in the first RAM 16 based on the transmission destination specifying information provided from the second cordless communication means 111 at Step d3, and the process then proceeds to Step d12.

At Step d12, the first controlling means 4 controls the Internet communication means 13 to transmit the image information stored in the first RAM 16 to the transmission destination through the Internet communication network, based on the e-mail address information 36 read out at Step d11, and the process then proceeds to Step d10. At Step d10, the process of transmitting the image information is completed.

As described above, when the user inputs the transmission destination specifying information and depresses the second communication starting key, then the communication apparatus 1, depending on whether the second handset 114 is in the second on-hook state or in the second off-hook state, transmits to the transmission destination the image information through either one of the two networks, the public telephone network and the Internet communication network. The second on-hook state and the second off-hook state are capable of being switched by a simple operation that the user places the second handset 114 on the second placement section, or takes up the second handset 114 from the second placement section. Accordingly, the simple operation of placing the second handset 114 on the second placement section, or taking up the second handset 114 from the first placement section, allows the user to freely select a network of the two networks, the public telephone network and the Internet communication network, through which the image information is to be transmitted to the transmission destination. Thus, the user is capable of easily selecting a network of the two networks, the public telephone network and the Internet communication network, through which the image information is to be transmitted, allowing for improvement in the convenience of the user.

In addition, second hook state information showing that whether the second handset 114 is in the second on-hook state or in the second off-hook state, is transmitted from the slave unit 3 to the host unit 2 by a wireless communication. Accordingly, performing the operation of placing the second handset 114 on the second placement section, or taking up the second handset 114 from the first placement section, allows the user being away from the host unit 2, to select a network of the two networks, the public telephone network and the Internet communication network, through which the image information is to be transmitted to the transmission destination. Thus, the user being away from the host unit 2 is capable of selecting a network of the two networks, the public telephone network and the Internet communication network, through which the image information is to be transmitted, allowing for improvement in the convenience of the user.

In still another embodiment of the invention, the communication apparatus 1 transmits image information to a transmission destination through either one of the public telephone network or the Internet communication network, based on the number of depressions of the second hook button.

When the second hook button is depressed in the initial state, the first controlling means 4 causes the second RAM 116 to store a numerical value "1" as second hook button depressing information, based on the detection result of the second sensor means 121 transmitted from the slave unit 3. In addition, when the second hook button is depressed in the case where the second hook button depressing information is the numerical value "1", the first controlling means 4 causes the first RAM 16 to store a numerical value "0" as the second hook button depressing information.

FIG. 8 is a flowchart illustrating a process in which the communication apparatus 1 transmits image information to a transmission destination based on the number of depressions of the second hook button. In the initial state, a user of the communication apparatus 1 operates the second input means 117 in the slave unit 3 so that a transmission destination selecting screen for selecting the transmission destination is displayed on the second display means 107, and when the user starts an operation of inputting transmission destination specifying information for specifying the transmission destination, the process then proceeds from Step e0 to Step e1. In processes described below, the user should not perform an operation of switching to the first off-hook state, switching to the second off-hook state, or depressing the first hook button.

The user of the communication apparatus 1 operates the second input means 117 while checking the transmission destination selecting screen displayed by the second display means 107, to thereby input to the communication apparatus 1 the transmission destination specifying information indicative of the transmission destination to which the image information is to be transmitted.

At Step e1, the second controlling means 104 in the slave unit 3 determines whether or not the transmission destination specifying information is inputted. When the second controlling means 104 determines that the transmission destination specifying information is not inputted, Step e1 is repeated. When the second controlling means 104 determines that the transmission destination specifying information is inputted, the second controlling means 104 obtains the transmission destination specifying information, and the process then proceeds to Step e2.

At Step e2, the second controlling means 104 controls the second cordless communication means 111 to transmit to the host unit 2 the transmission destination specifying information obtained at Step e1, and the process then proceeds to Step e3.

At Step e3, the first cordless communication means 11 in the host unit 2 receives the transmission destination specifying information provided from the slave unit 3, and provides the transmission destination specifying information thus received to the first controlling means 4, whereafter the process proceeds to Step e4.

At Step e4, the second controlling means 104 determines whether or not the second communication starting key in the slave unit 3 is depressed. When the second controlling means 104 determines that the second communication starting key is not depressed, Step e4 is repeated. When the second controlling means 104 determines that the second communication starting key is depressed, the process then proceeds to Step e5.

At Step e5, the second controlling means 104 controls the second cordless communication means 111 in the slave unit 3, and transmits to the host unit 2 information showing that the second communication starting key is depressed, whereafter the process proceeds to Step e6.

At Step e6, the first cordless communication means 11 in the host unit 2 receives the information showing that the second communication starting key is depressed, which is transmitted from the second cordless communication means 111, to provide to the first controlling means 4 in the host unit 2.

At Step e7, the first controlling means 4 reads out second hook button depressing information stored in the first RAM 16, and determines whether or not the second hook button has been depressed odd number of times after the user starts the operation of inputting the transmission destination specifying information. When the first controlling means 4 determines that the second hook button has been depressed odd number of times after the user starts the operation of inputting the transmission destination specifying information, that is, when a numerical value "1" is stored as the second hook button depressing information in the first RAM 16, the process then proceeds to Step e8.

At Step e8, the first controlling means 4 reads out phone number information 35 of the transmission destination stored in the first RAM 16, based on the transmission destination specifying information provided from the first cordless communication means 11 at Step e3, and the process then proceeds to Step e9.

At Step e9, the first controlling means 4 controls the telephone line communication means 12 to transmit the image information stored in the first RAM 16 to the transmission destination through the public telephone network, based on the phone number information 35 read out at Step e9, and the process then proceeds to Step e10 at which the process of transmitting the image information is completed.

At Step e7, when the first controlling means 4 determines that the second hook button has been depressed even number of times after the user starts the operation of inputting the transmission destination specifying information, or determines that the second hook button has never been depressed after the user starts the operation of inputting the transmission destination specifying information, the process then proceeds to Step e11. Specifically, when a numerical value "0" is stored in the first RAM 16 as the second hook button depressing information, the process then proceeds to Step e11.

At Step e11, the first controlling means 4 reads out e-mail address information 36 of the transmission destination stored in the first RAM 16, based on the transmission destination specifying information provided from the first cordless communication means 11 at Step e3, and the process proceeds to Step e12.

At Step e12, the first controlling means 4 controls the Internet communication means 13 to transmit the image information stored in the first RAM 16 through the Internet communication network to the transmission destination, based on the e-mail address information 36 read out at Step e11, and the process then proceeds to Step e10. At Step e10, the process of transmitting the image information is completed.

As described above, when the user inputs the transmission destination specifying information and depresses the second communication starting key, then the communication apparatus 1 transmits the image information through either one of the two networks, the public telephone network and the Internet communication network, to the transmission destination, depending on how many times the second hook button has been depressed from the time when the user started the operation of inputting the transmission destination specifying information until the time when the second communication starting key is depressed. Accordingly, a simple operation of depressing the second hook button allows the user to freely select a network of the two networks, the public telephone network and the Internet communication network, through which the image information is to be transmitted to the transmission destination. Thus, the user is capable of easily selecting a network of the two networks, the public telephone network and the Internet communication network, through which the image information is to be transmitted, allowing for improvement in the convenience of the user.

In addition, the second hook button depressing information showing that the second hook button is depressed, is transmitted from the slave unit 3 to the host unit 2 by a wireless communication. Accordingly, performing the operation of depressing the second hook button allows the user being away from the host unit 2, to select a network of the two networks, the public telephone network and the Internet communication network, through which the image information is to be transmitted to the transmission destination. Thus, the user being away from the host unit 2 is capable of selecting, a network of the two networks, the public telephone network and the Internet communication network, through which the image information is to be transmitted, allowing for improvement in the convenience of the user.

In the communication apparatus 1 of each embodiment described above, the line state is switched when a user depresses the first hook button or the second hook button, however, the line state may be changed, for example, by the user's operation of sliding a slide switch or pulling up a button, without limitation to the user's operation of depressing each hook button.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention, even if a network for transmitting information is not previously registered for each transmission destination, it is possible to select a user's desired network of the two networks, and to transmit the information to a transmission destination through the selected network, allowing for improvement in the convenience of the user.

Further, according to the invention, a user's simple operation of operating the operation switch allows a user to transmit information to a transmission destination through a desirable network of the two networks, the public telephone network and the Internet communication network, allowing for improvement in the convenience of the user.

Further, according to the invention, a user being away from the first wireless communication means is capable of selecting a desirable network of the two networks, the public telephone network and the Internet communication network, and transmitting information to a transmission destination through the selected network, allowing for improvement in the convenience of the user.

Further, according to the invention, a simple operation of switching a handset to an on-hook state or an off-hook state allows a user to select a desirable network of the two networks, the public telephone network and the Internet communication network, and transmit information to a transmission destination through the selected network, allowing for improvement in the convenience of the user.

Further, according to the invention, a user being away from the first wireless communication means is capable of selecting a desirable network of the two networks, the public telephone network and the Internet communication network, and transmitting information to a transmission destination through the selected network, allowing for improvement in the convenience of the user.

The invention claimed is:

1. A communication apparatus which is capable of performing a telephone line communication by use of a public telephone network as well as performing an Internet communication by use of an Internet communication network and which transmits information to the public telephone network or the Internet communication network, the communication apparatus comprising:
   storage means for storing, for respective transmission destinations, a phone number and e-mail address corresponding to a transmission destination;
   selecting means for selecting a predetermined transmission destination from among the transmission destinations stored in the storage means;
   telephone line communication means for transmitting the information to the public telephone network;
   Internet communication means for transmitting the information to the Internet communication network;
   line state switching means for selectively switching a first line state where the telephone line communication means is connected to the public telephone network, and a second line state where the telephone line communication means is disconnected from the public telephone network;
   line state detecting means for detecting whether the telephone line communication means is in the first line state or in the second line state with respect to the public telephone network; and
   controlling means for, in response to a detection result of the line state detecting means, causing the telephone line communication means to transmit the information to the transmission destination selected by the selecting means when the line state detecting means detects the first line state, and causes the Internet communication means to transmit the information to the transmission destination selected by the selecting means when the line state detecting means detects the second line state.

2. The communication apparatus of claim 1, further comprising an operation switch,
   wherein the line state detecting means detects whether or not the operation switch is operated, and
   the line state switching means, based on the detection result of the line state detecting means, switches from the first line state to the second line state when the operation switch is operated in the first line state, and switches from the second line state to the first line state when the operation switch is operated in the second line state.

3. The communication apparatus of claim 2, further comprising:
   first wireless communication means capable of communicating by radio; and second wireless communication means capable of communicating with the first wireless communication means by radio, wherein the second wireless communication means transmits the detection result of the line state detecting means to the first wireless communication means, and the line state switching means obtains the detection result of the line state detecting means received by the first wireless communication means.

4. The communication apparatus of claim 1, further comprising:

a handset; and a placement section on which the handset is capable of being placed, wherein the line state detecting means detects whether or not the handset is placed on the placement section, and the line state switching means, based on the detection result, switches to the second line state when the handset is placed on the placement section, and switches to the first line state when the handset is not placed on the placement section.

5. The communication apparatus of claim 4, further comprising:

first wireless communication means capable of communicating by radio; and second wireless communication means capable of communicating with the first wireless communication means by radio, wherein the second wireless communication means transmits the detection result of the line state detecting means to the first wireless communication means, and the line state switching means obtains the detection result of the line state detecting means received by the first wireless communication means.

* * * * *